No. 819,475. PATENTED MAY 1, 1906.
C. H. TURNER.
JOURNAL LUBRICATOR.
APPLICATION FILED APR. 6, 1905.

WITNESSES:
John J. Kittle
C. R. Ferguson

INVENTOR
Charles H. Turner
BY
Munn
ATTORNEYS

UNITED STATES PATENT OFFICE.

CHARLES HUNTINGTON TURNER, OF NEW YORK, N. Y.

JOURNAL-LUBRICATOR.

No. 819,475.                    Specification of Letters Patent.                    Patented May 1, 1906.

Application filed April 6, 1905. Serial No. 254,097.

*To all whom it may concern:*

Be it known that I, CHARLES HUNTINGTON TURNER, a citizen of the United States, and a resident of the city of New York, borough of Brooklyn, in the county of Kings and State of New York, have invented a new and Improved Journal-Lubricator, of which the following is a full, clear, and exact description.

This invention relates to improvements in devices for applying lubricant to car-wheel journals, the object being to provide a device of this character that may be readily placed in a journal-box of the usual construction.

Other objects of the invention will appear in the general description.

I will describe a journal-lubricator embodying my invention and then point out the novel features in the appended claim.

Reference is to be had to the accompanying drawings, forming a part of this specification, in which similar characters of reference indicate corresponding parts in both figures.

Figure 2:
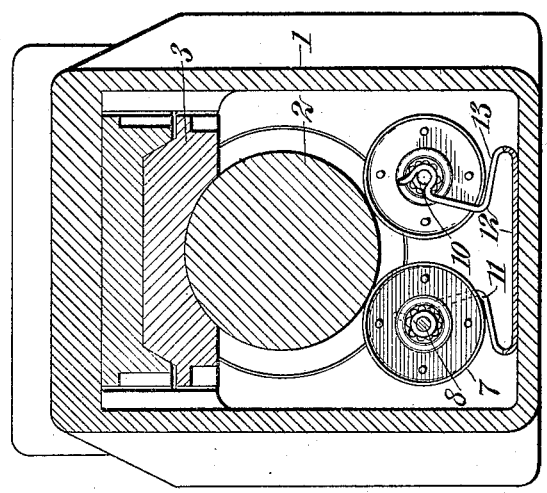
Figure 1:
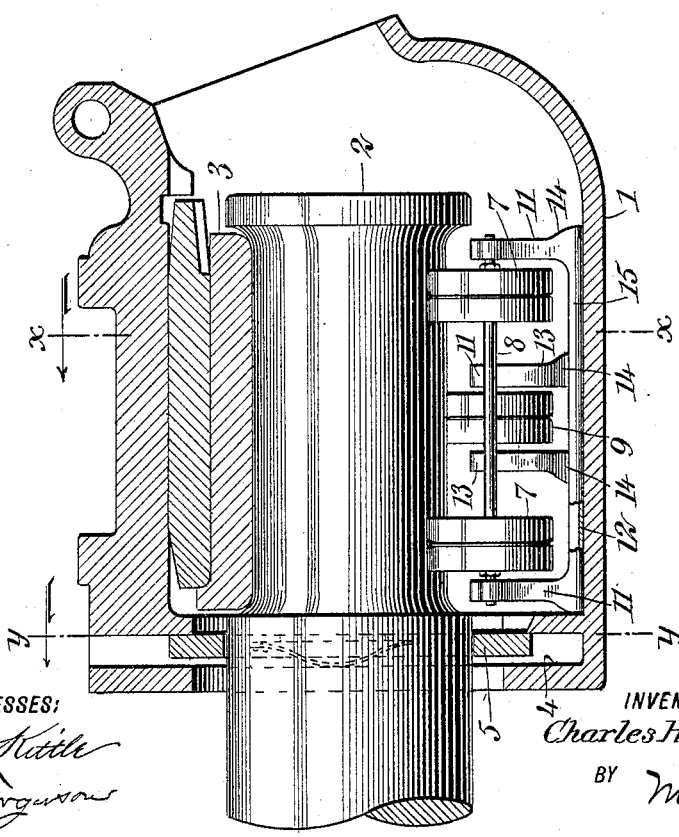

Figure 1 is an elevation, partly in section, of a journal, a journal-box, and a lubricator embodying my invention as in position. Fig 2 is a section on the line $x\,x$ of Fig. 1.

Referring to the drawings, 1 designates a journal-box of the ordinary construction and into which the journal 2 is extended, the said journal being engaged by the usual brass 3. At the inner end of the journal-box is a chamber 4, in which a splash-ring 5 is placed. This splash-ring of course surrounds the journal, and it is pressed against the inner wall of the chamber 4 by means of flat springs 6, the said springs at their central portion engaging against the outer wall of the chamber 4. This ring will prevent oil from splashing out around the journal.

The lubricant-applying device consists of a pair of rollers 7, mounted on a shaft 8 and designed to engage with the journal at one side of its axis, and a single roller 9 is mounted on a shaft 10 to engage with the opposite side of the journal, as clearly illustrated in Fig. 2. The shaft 8 for the rollers 7 has bearings in spring yielding fingers 11, extended upward from a plate 12, which rests upon the bottom of the journal-box. The shaft 10 for the roller 9 has its bearings in fingers 13, also extended upward from said plate 12. It will be noted that the bearings are made in the form of hooks, so that the shafts may be readily placed therein or removed, if necessary. It will also be noted that the fingers are curved inward and then outward, giving them a sufficient length to provide for the necessary yielding movement. It will also be noted that the fingers at the junction with the base-plate are widened, as indicated at 14. These widened portions are practically rigid and will prevent any possible breaking of the fingers at the base. The opposite edges of the base-plate 12 have upwardly-extended flanges 15, which serve to stiffen said plate.

The lubricant-applying rollers are made in two sections, and operate on ball-bearings 16, arranged in bearing-cups 17 and engaging with raceways or cones 18, secured to the shafts.

In the operation the lubricant will be taken up from the lower portion of the journal-box and applied by the rollers to the journal.

Having thus described my invention, I claim as new and desire to secure by Letters Patent—

The combination with a journal-box and a journal therein, of a base-plate removably resting on the bottom of the box, there being upwardly-extended stiffening-flanges on opposite sides of the plate, resilient fingers on the plate, the said fingers being curved inward and then outward at opposite sides of the plate, shafts having bearings in the fingers, and rollers mounted on the shafts.

In testimony whereof I have signed my name to this specification in the presence of two subscribing witnesses.

CHARLES HUNTINGTON TURNER.

Witnesses:
 H. G. FRY,
 ROGER GRAY.